United States Patent
Guo et al.

(10) Patent No.: US 9,247,254 B2
(45) Date of Patent: Jan. 26, 2016

(54) NON-SQUARE TRANSFORMS IN INTRA-PREDICTION VIDEO CODING

(71) Applicant: Qualcomm Incorporated, San Diego, CA (US)

(72) Inventors: Liwei Guo, San Diego, CA (US); Xianglin Wang, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 143 days.

(21) Appl. No.: 13/659,546

(22) Filed: Oct. 24, 2012

(65) Prior Publication Data

US 2013/0107950 A1   May 2, 2013

Related U.S. Application Data

(60) Provisional application No. 61/552,327, filed on Oct. 27, 2011.

(51) Int. Cl.
| | |
|---|---|
| *H04N 11/02* | (2006.01) |
| *H04N 11/04* | (2006.01) |
| *H04N 19/11* | (2014.01) |
| *H04N 19/70* | (2014.01) |
| *H04N 19/46* | (2014.01) |
| *H04N 19/122* | (2014.01) |

(52) U.S. Cl.
CPC ............. *H04N 19/11* (2014.11); *H04N 19/122* (2014.11); *H04N 19/46* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 2005/0249291 A1 | 11/2005 | Gordon et al. | |
| 2010/0086049 A1* | 4/2010 | Ye et al. | 375/240.16 |
| 2011/0038412 A1* | 2/2011 | Jung et al. | 375/240.12 |
| 2011/0135000 A1* | 6/2011 | Alshina et al. | 375/240.13 |
| 2011/0243225 A1* | 10/2011 | Min et al. | 375/240.12 |
| 2011/0310973 A1* | 12/2011 | Cheon et al. | 375/240.18 |
| 2012/0033731 A1 | 2/2012 | Yamamoto et al. | |
| 2012/0082225 A1 | 4/2012 | Chen et al. | |
| 2012/0106631 A1 | 5/2012 | Kim et al. | |

(Continued)

FOREIGN PATENT DOCUMENTS

| | | |
|---|---|---|
| EP | 2763415 A1 | 8/2014 |
| WO | 2010039822 A2 | 4/2010 |

(Continued)

OTHER PUBLICATIONS

Wiegand et al., "WD1: Working Draft 1 of High-Efficiency Video Coding", JCTVC-C403, 3rd Meeting: Guangzhou, CN, Oct. 7-15, 2010, 137 pp.

(Continued)

*Primary Examiner* — Jorge L Ortiz Criado
*Assistant Examiner* — Samuel D Fereja
(74) *Attorney, Agent, or Firm* — Shumaker & Sieffert, P.A.

(57) ABSTRACT

This disclosure describes techniques for determining transform partitions in video encoding processes that allow for non-square transform partitions in intra-coded blocks. According to one example of the disclosure, a video coding method comprise partitioning a coding unit into multiple prediction units, and determining a transform partition for each of the prediction units, wherein at least one transform partition is a non-square partition.

32 Claims, 15 Drawing Sheets hNx2N TU Partition

2NxhN TU Partition

(56) References Cited

U.S. PATENT DOCUMENTS

2012/0147961 A1     6/2012    Guo et al.
2012/0201296 A1*   8/2012    Kim et al. ............ 375/240.03
2012/0281928 A1*   11/2012   Cohen et al. ............ 382/240

FOREIGN PATENT DOCUMENTS

WO     WO 2011037337 A2 *   3/2011
WO          2013047805 A1     4/2013

OTHER PUBLICATIONS

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 2011, JCTVC-G1103_d2, 214 pp.

Cao et al., "CE6.b1 Report on Short Distance Intra Prediction Method," JCTVC-E278, 5th Meeting, Geneva, Mar. 2011, 5 pp.

International Search Report and Written Opinion—PCT/US2012/061878—ISA/EPO—Jan. 4, 2013, 15 pp.

Itu-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Panusoponc et al., "Efficient Transform Unit Representation," JCTVC-D250r2, 4th Meeting, Daegu, KR, Jan. 20-28, 2011, 3 pp.

Bross et al., "High efficiency video coding (HEVC) text specification draft 6," 7th Meeting: Geneva, CH, Nov. 21-30, 2011, JCTVC-H1003, 259 pp.

Bross et al., "High efficiency video coding (HEVC) text specification draft 7," 9th Meeting: Geneva, CH, Apr. 27-May 7, 2012, JCTVC-I1003_d21, 290 pp.

Bross et al., "High efficiency video coding (HEVC) text specification draft 8," 10th Meeting: Stockholm, SE, Jul. 11-20, 2012, JCTVC-J1003_d7, 261 pp.

Wien et al., "Hybrid Video Coding Using Variable Size Block Transforms," Visual Communications and Image Processing, 2002, Kuo J.C.C., Editor, Proceedings of SPIE, vol. 4671, 2002, pp. 1040-1051.

Yuan et al., "CE2: Non-Square Quadtree Transform for Symmetric and Asymmetric Motion Partition," JCTVC-F412, 6th Meeting, Torino, IT, Jul. 14-22, 2011, 7 pp.

Bross et al., "High efficiency video coding (HEVC) text specification draft 6," 8th Meeting: San Jose, CA, USA, Feb. 1-10, 2012, JCTVC-H1003, 259 pp.

International Preliminary Report on Patentability—PCT/US2012/061878, The International Bureau of WIPO—Geneva, Switzerland, Mar. 5, 2014, 8 pp.

Jia S., et al., "Low Complexity Quadtree based All Zero Block Detection Algorithm for HEVC", APSIPA ASC, Oct. 18-21, 2011, Oct. 18, 2011, pp. 1-10, XP055082774.

Bross et al., "High efficiency video coding (HEVC) text specification draft 9," 11th Meeting: Shanghai, CN, Oct. 10-19, 2012, JCTVC-K1003_v7, 290 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Second Written Opinion from International Application No. PCT/US2012/061878, dated Feb. 25, 2014, 18 pp.

Panusopone et al., "RQT with rectangular transform unit support," Joint Collaborative Team on Video Coding (JCT-VC) of ITU-T SG16 WP3 and ISO/IEC JTC1/SC29/WG11, 6th Meeting: Torino, IT, Jul. 14-22, 2011, JCTVC-F578-r3, 4 pp.

\* cited by examiner

2Nx2N PU Partition

NxN PU Partition hNx2N TU Partition  2NxhN TU Partition

2NxhN TU Partitions hNx2N TU Partitions

1/16NxN Partitioning of Sub-block 43A

1/4Nx1/4N Partitioning of Sub-block 43A

1/8Nx1/2N Partitioning of Sub-block 43A

NON-SQUARE TRANSFORMS IN INTRA-PREDICTION VIDEO CODING

RELATED APPLICATIONS

This application claims the benefit of U.S. Provisional Application No. 61/552,327, filed Oct. 27, 2011, the entire content of which is hereby incorporated by reference.

TECHNICAL FIELD

This disclosure relates to video coding, and more particularly to techniques for performing intra-prediction when coding video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, to transmit, receive and store digital video information more efficiently.

Video compression techniques include spatial prediction and/or temporal prediction to reduce or remove redundancy inherent in video sequences. For block-based video coding, a video frame or slice may be partitioned into blocks. Each block can be further partitioned. Blocks in an intra-coded (I) frame or slice are encoded using spatial prediction with respect to reference samples in neighboring blocks in the same frame or slice. Blocks in an inter-coded (P or B) frame or slice may use spatial prediction with respect to reference samples in neighboring blocks in the same frame or slice or temporal prediction with respect to reference samples in other reference frames. Spatial or temporal prediction results in a predictive block for a block to be coded. Residual data represents pixel differences between the original block to be coded and the predictive block.

An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in a particular order to produce a one-dimensional vector of transform coefficients for entropy coding.

SUMMARY

In general, this disclosure describes techniques for coding video data. This disclosure describes techniques for selecting transform partitions in video encoding processes that allow for non-square transform partitions.

According to one example of the disclosure, a video encoding method includes partitioning a coding unit into multiple prediction units, wherein the coding unit is encoded using intra-prediction, and determining a transform partition for each of the prediction units, wherein at least one transform partition is a non-square partition. In one example, each of the multiple prediction units has the same transform partition. In another example, a transform partition for each of the multiple prediction units is determined separately. In one example, syntax elements are signaled to indicate the type of partition (e.g., square or non-square), and the direction of the partition (e.g., vertical or horizontal) in the case of a non-square partition.

According to another example of the disclosure, a video decoding method includes partitioning a coding unit into multiple prediction units, wherein the coding unit is encoded using intra-prediction, and determining a transform partition for each of the prediction units, wherein at least one transform partition is a non-square partition. In one example, each of the multiple prediction units has the same transform partition. In another example, a transform partition for each of the multiple prediction units is determined separately. In one example, syntax elements are received in an encoded video bitstream to indicate the type of partition (e.g., square or non-square), and the direction of the partition (e.g., vertical or horizontal) in the case of a non-square partition.

This disclosure also describes apparatuses, devices, and computer-readable storage medium configured to perform the methods disclosed.

The details of one or more examples are set forth in the accompanying drawings and the description below. Other features, objects, and advantages will be apparent from the description and drawings, and from the claims.

DETAILED DESCRIPTION

In general, this disclosure describes techniques for coding video data. In some examples, this disclosure describes techniques for selecting transform partitions in video coding processes that allow for non-square transform partitions. The techniques of this disclosure allow for a more flexible approach to selecting and using non-square transform partitions in intra-prediction video coding, thus providing additional opportunities to improve coding compression and/or video quality.

Figure 1:
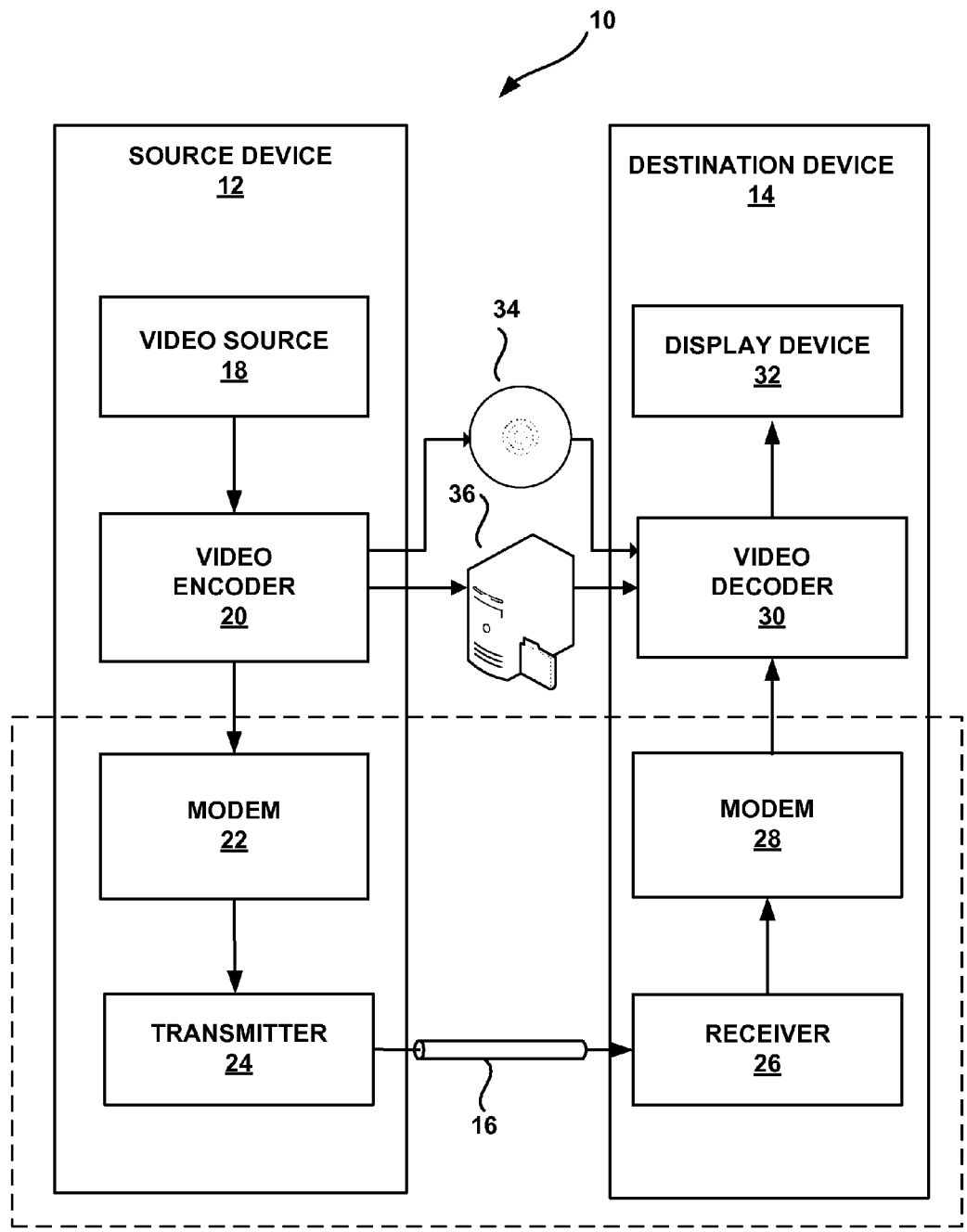
FIG. 1 is a block diagram illustrating an example video encoding and decoding system.

FIG. 1 is a block diagram illustrating an example video encoding and decoding system 10 that may be configured to utilize techniques for intra-prediction coding in accordance with examples of this disclosure. As shown in FIG. 1, system 10 includes source device 12 that transmits encoded video to destination device 14 via communication channel 16. Encoded video data may also be stored on storage medium 34 or file server 36 and may be accessed by destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

Source device 12 and destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, communication channel 16 may comprise a wireless channel, a wired channel, or a combination of wireless and wired channels suitable for transmission of encoded video data. Similarly, file server 36 may be accessed by destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for intra-prediction coding, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, modulator/demodulator 22 and transmitter 24. In source device 12, video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications, or application in which encoded video data is stored on a local disk.

The captured, pre-captured, or computer-generated video may be encoded by video encoder 20. The encoded video information may be modulated by modem 22 according to a communication standard, such as a wireless communication protocol, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

The captured, pre-captured, or computer-generated video that is encoded by video encoder 20 may also be stored onto storage medium 34 or file server 36 for later consumption. Storage medium 34 may include Blu-ray discs, DVDs, CD-ROMs, flash memory, or any other suitable digital storage media for storing encoded video. The encoded video stored on storage medium 34 may then be accessed by destination device 14 for decoding and playback.

File server 36 may be any type of server capable of storing encoded video and transmitting that encoded video to destination device 14. Example file servers include a web server (e.g., for a website), an FTP server, network attached storage (NAS) devices, a local disk drive, or any other type of device capable of storing encoded video data and transmitting it to a destination device. The transmission of encoded video data from file server 36 may be a streaming transmission, a download transmission, or a combination of both. File server 36 may be accessed by destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

Destination device 14, in the example of FIG. 1, includes receiver 26, modem 28, video decoder 30, and display device 32. Receiver 26 of destination device 14 receives information over channel 16, and modem 28 demodulates the information to produce a demodulated bitstream for video decoder 30. The information communicated over channel 16 may include a variety of syntax information generated by video encoder 20 for use by video decoder 30 in decoding video data. Such syntax may also be included with the encoded video data stored on storage medium 34 or file server 36. Each of video encoder 20 and video decoder 30 may form part of a respective encoder-decoder (CODEC) that is capable of encoding or decoding video data.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the High Efficiency Video Coding (HEVC) standard presently under development by the Joint Collaboration Team on Video Coding (JCT-VC) of ITU-T Video Coding Experts Group (VCEG) and ISO/IEC Motion Picture Experts Group (MPEG). A recent latest Working Draft (WD) of HEVC, and referred to as HEVC WD8 hereinafter, is available from http://phenix.int-evry.fr/jct/doc_end_user/documents/10_Stockholm/wg11/JCTVC-J1003-v8.zip as of Sep. 24, 2012. Video encoder 20 and video decoder 30 may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Video encoder 20 may implement any or all of the techniques of this disclosure for intra-prediction coding in a video encoding process. Likewise, video decoder 30 may implement any or all of these techniques for intra-prediction coding in a video coding process. A video coder, as described in this disclosure, may refer to a video encoder or a video decoder. Similarly, a video coding unit may refer to a video encoder or a video decoder. Likewise, video coding may refer to video encoding or video decoding.

In accordance with the techniques of this disclosure, video encoder 20 may be configured to partition a coding unit into multiple prediction units, wherein the coding unit is encoded using intra-prediction, and determine a transform partition for each of the prediction units, wherein at least one of the transform partitions for the prediction unit is a non-square partition.

Likewise, in accordance with the techniques of this disclosure, video decoder 30 may be configured to partition a coding unit into multiple prediction units, wherein the coding unit is encoded using intra-prediction, and determine a transform partition for each of the prediction units, wherein at least one of the transform partitions for the prediction unit is a non-square partition. Video decoder 30 may be further configured to receive a first syntax element indicating a transform type, wherein the transform type is selected from at least one of a square transform partition and a non-square transform partition, in the case that the first syntax element indicates the non-square transform type, receive a second syntax element indicating a transform direction for each transform partition having the non-square transform type, wherein the transform direction is selected from at least one of a horizontally-oriented direction and a vertically-oriented direction, partition a coding unit into multiple prediction units, wherein the coding unit is encoded using intra-prediction, and determine a transform partition for each of the prediction units according the received first and second syntax element.

Digital video devices, such as video encoding and decoding system 10 of FIG. 1, implement video compression techniques to encode and decode digital video information more efficiently. Video compression may apply spatial (intra-frame) prediction and/or temporal (inter-frame) prediction techniques to reduce or remove redundancy inherent in video sequences.

A typical video encoder partitions each frame of the original video sequence into contiguous rectangular regions called "blocks" or "coding units." These blocks are encoded in "intra mode" (I-mode, or generally intra-prediction), or in "inter mode" (P-mode, B-mode, or generally, inter-prediction).

For P-mode and B-mode, the encoder first searches for one or more blocks similar to the one being encoded in a "reference frame," denoted by $F_{ref}$. Searches are generally restricted to being no more than a certain spatial displacement from the block to be encoded. When the best match, or "prediction," has been identified, it is expressed in the form of a two-dimensional (2D) motion vector ($\Delta y$, $\Delta y$) where $\Delta x$ is the horizontal and $\Delta y$ is the vertical displacement. The motion vectors together with the reference frame are used to construct predicted block $F_{pred}$ as follows:

$$F_{pred}(x,y)=F_{ref}(x+\Delta x, y+\Delta y)$$

The location of a pixel within the frame is denoted by (x, y). For blocks encoded in I-mode, the predicted block is formed using spatial prediction from previously encoded neighboring blocks within the same frame.

For both I-mode and P- or B-mode, the prediction error, i.e., the difference between the pixel values in the block being encoded and the predicted block, is represented as a set of weighted basis functions of some discrete transform, such as a discrete cosine transform (DCT). Transforms may be performed based on different size of blocks, such as 4×4, 8×8 or 16×16 and larger. In some situations (e.g., in inter-coding), the shape of the transform block is not always square. Rectangular shaped transform blocks can also be used, e.g. with a transform block size of 16×4, 32×8, etc.

The weights (i.e., the transform coefficients) are subsequently quantized. Quantization introduces a loss of information, and as such, quantized coefficients have lower precision than the original transform coefficients.

Quantized transform coefficients and motion vectors are examples of "syntax elements." These syntax elements, plus some control information, form a coded representation of the video sequence. Syntax elements may also be entropy coded, thereby further reducing the number of bits needed for their representation. Entropy coding is a lossless operation aimed at minimizing the number of bits required to represent transmitted or stored symbols (in our case syntax elements) by utilizing properties of their distribution (some symbols occur more frequently than others).

In the decoder, the block in the current frame is obtained by first constructing its prediction in the same manner as in the encoder, and by adding to the prediction the prediction error. The prediction error is found by weighting the transform basis functions using the quantized coefficients. The difference between the reconstructed frame and the original frame is called reconstruction error.

The compression ratio, i.e. the ratio of the number of bits used to represent original sequence and the compressed one, may be controlled by adjusting the value of the quantization parameter (QP) used when quantizing transform coefficients. The compression ratio may depend on the method of entropy coding employed.

For video coding according to the emerging HEVC standard, a video frame may be partitioned into coding units. A coding unit (CU) generally refers to an image region that serves as a basic unit to which various coding tools are applied for video compression. A CU usually has a luminance component, sometimes denoted as Y, and two chroma components, sometimes denoted as U and V. Depending on the video sampling format, the size of the U and V components, in terms of number of samples, may be the same as or different from the size of the Y component. A CU is typically square, and may be considered to be similar to a so-called macroblock, e.g., under other video coding standards such as ITU-T H.264. Coding according to some of the presently proposed aspects of the developing HEVC standard will be described in this application for purposes of illustration. However, the techniques described in this disclosure may be useful for other video coding processes, such as those defined according to H.264 or other standard or proprietary video coding processes.

HEVC standardization efforts are based on a model of a video coding device referred to as the HEVC Test Model (HM). The HM presumes several capabilities of video coding devices over devices according to, e.g., ITU-T H.264/AVC. For example, whereas H.264 provides nine intra-prediction encoding modes, HM provides as many as thirty-five intra-prediction encoding modes.

Figure 2:
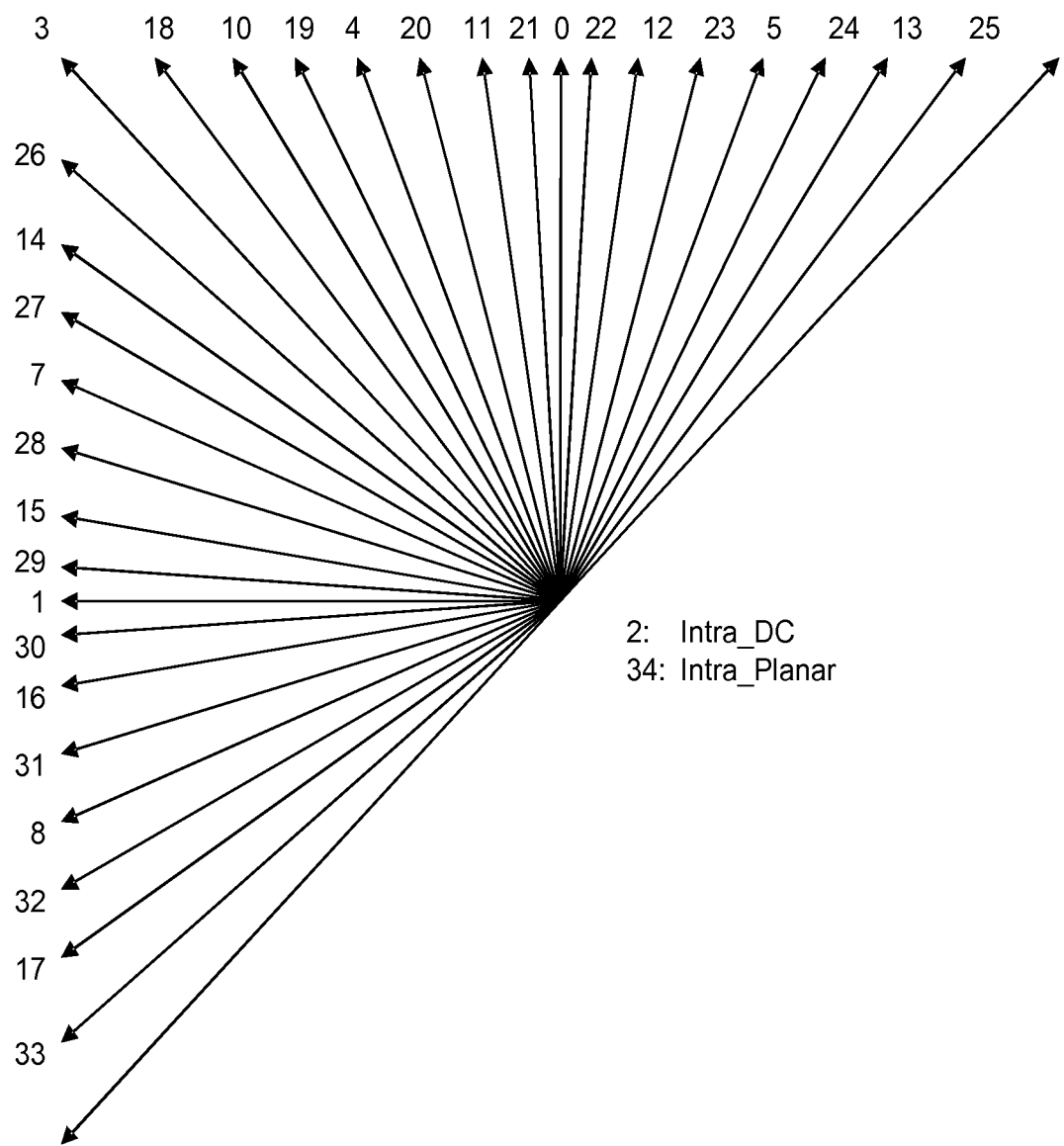
FIG. 2 is a conceptual diagram illustrating example intra-prediction mode directions.

The thirty-five intra-prediction modes in HEVC include one DC mode, one planar mode, and 33 different directional prediction modes. With a directional prediction mode, prediction is performed based on neighboring block reconstructed pixels along a certain direction indicated by the mode. The directions associated with different prediction modes are shown in FIG. 2.

According to the HM, a CU may include one or more prediction units (PUs) and/or one or more transform units (TUs). Syntax data within a bitstream may define a largest coding unit (LCU), which is a largest CU in terms of the number of pixels. In general, a CU has a similar purpose to a macroblock of H.264, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU). This disclosure also uses the term "block", "partition," or "portion" to refer to any of a CU, PU, or TU. In general, "portion" may refer to any sub-set of a video frame.

An LCU may be associated with a quadtree data structure. In general, a quadtree data structure includes one node per CU, where a root node corresponds to the LCU. If a CU is split into four sub-CUs, the node corresponding to the CU includes four leaf nodes, each of which corresponds to one of the sub-CUs. Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, 4 sub-CUs of a leaf-CU will also be referred to as leaf-CUs although there is no explicit splitting of the original leaf-CU. For example if a CU at 16×16 size is not split further, the four 8×8 sub-CUs will also be referred to as leaf-CUs although the 16×16 CU was never split.

A leaf-CU may include one or more prediction units (PUs). In general, a PU represents all or a portion of the corresponding CU, and may include data for retrieving a reference sample for the PU. For example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-quarter pixel precision or one-eighth pixel precision), a reference frame to which the motion vector points, and/or a reference list (e.g., list 0 or list 1) for the motion vector. Data for the leaf-CU defining the PU(s) may also describe, for example, partitioning of the CU into one or more PUs. Partitioning modes may differ depending on whether the CU is uncoded, intra-prediction mode encoded, or inter-prediction mode encoded. For intra coding, a PU may be treated the same as a leaf transform unit described below.

The emerging HEVC standard allows for transformations according to transform units (TUs), which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

In general, a PU refers to data related to the prediction process. For example, when the PU is intra-mode encoded, the PU may include data describing an intra-prediction mode for the PU. As another example, when the PU is inter-mode encoded, the PU may include data defining a motion vector for the PU.

In general, a TU is used for the transform and quantization processes. A given CU having one or more PUs may also include one or more transform units (TUs). Following prediction, video encoder 20 may calculate residual values from the video block identified by the coding node in accordance with the PU. The coding node is then updated to reference the residual values rather than the original video block. The residual values comprise pixel difference values that may be transformed into transform coefficients, quantized, and scanned using the transforms and other transform information specified in the TUs to produce serialized transform coefficients for entropy coding. The coding node may once again be updated to refer to these serialized transform coefficients. This disclosure typically uses the term "video block" to refer to a coding node of a CU. In some specific cases, this disclosure may also use the term "video block" to refer to a treeblock, i.e., LCU, or a CU, which includes a coding node and PUs and TUs.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

Figure 3:
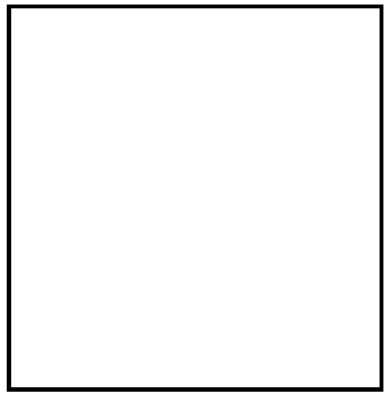
FIG. 3 is a conceptual diagram of example prediction units for intra-prediction.
Figure 3:
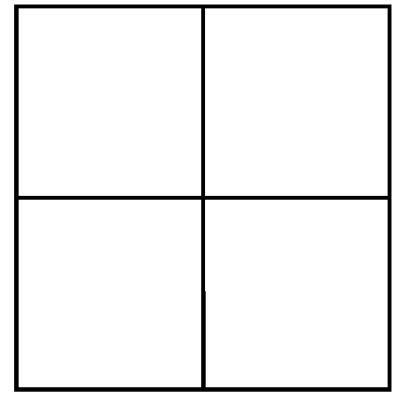

As shown in FIG. 3, for an intra-predicted CU of size 2N×2N, there are two PU partition types specified in one proposal for HEVC: a 2N×2N PU partition 19 and an N×N PU partition 21. In one proposal for HEVC, N×N is only allowed at a smallest CU level. However, the techniques of this disclosure may apply to N×N PU partitions of any size. The 2N×2N PU partition results in a PU that is the same size as the CU. For an N×N PU partition, the CU has 4 N×N PUs, each of which are a quarter of the size of the related CU. Each of the four PUs may have its' own intra-prediction mode direction.

Figure 4:
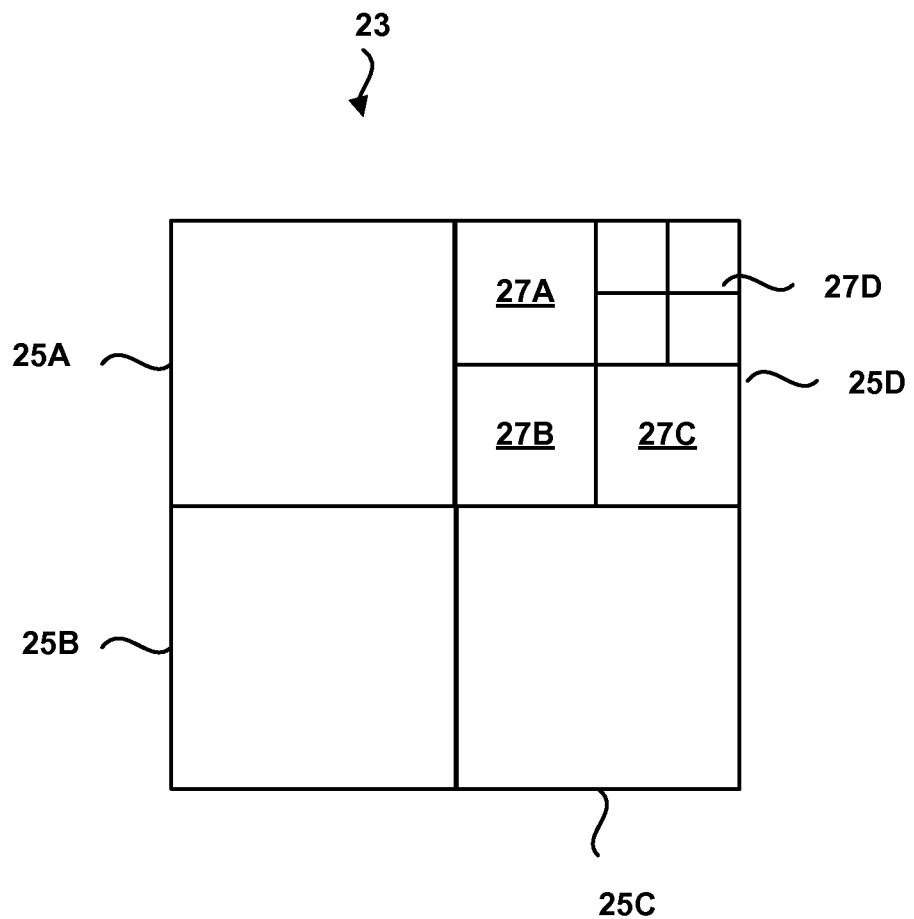
FIG. 4 is a conceptual diagram of an example quad-tree block structure.

HEVC allows a quadtree transform unit partition structure. As shown in FIG. 4, for example, the outer block 23 is a CU or LCU 23. In one proposal for HEVC, an LCU may be as large as 64×64, though the techniques of this disclosure are applicable for any size of CU or LCU. The interior blocks of outer block 23 represent the outcome of transform block (e.g., TU) decomposition according to a quad-tree structure. Of course, such an outcome is just one out of many possible decompositions. The decomposition indicates the size of a transform applied to a certain are of a coding unit. In effect, the decompositions indicate the size of TUs within the CU.

In the example of FIG. 4, there are three levels of transform block decompositions. With level 1 decomposition, the whole block is split into four quarter-sized transform blocks, 25A, 25B, 25C and 25D. Then, at level 2 decomposition, the level 1, quarter-sized transform block 25D is further split into four 1/16 sized transform blocks 27A, 27B, 27C, and 27D. Then, at level 3 decomposition, transform block 27D is further split into four even smaller (1/64 sized) transform blocks. A transform block at level 0 means that the whole CU is transformed together without further split. In this case, the TU has the same size of the CU. In practice, whether a TU is further split or not is determined based on rate-distortion optimization.

Figure 5:
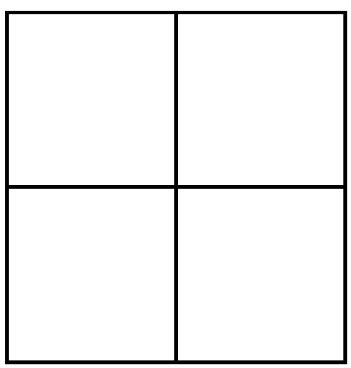
FIG. 5 is a conceptual diagram of example square transform unit partitions for intra-predicted blocks.
Figure 5:
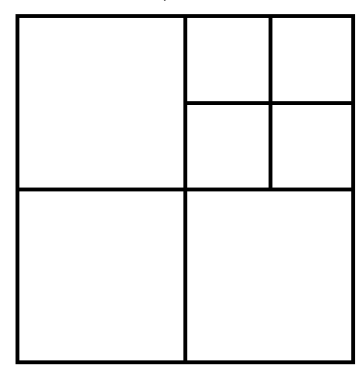

For a 2N×2N PU, according to one proposal for HEVC, only square-shaped TUs are allowed. In addition, the TUs are always aligned with PUs for an intra-predicted block. That is, TUs in an intra-predicted block have the same size and shape as the PUs in that block. Examples of square TUs are shown in FIG. 5. Block 29 is partitioned into four quarter-sized PUs/TUs. In block 31, the upper right quarter-sized PU/TU is further partitioned into four smaller PUs/TUs with a size of 1/16$^{th}$ the original block size. Based on proposals for HEVC, each of blocks 29 and 31 are predicted, transformed and reconstructed separately. The transform block (i.e., TU) size is the same as the prediction block (i.e., PU) size.

Figure 6:
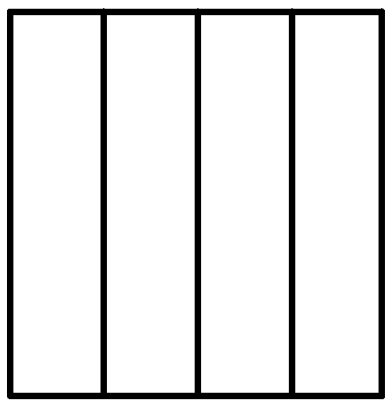
FIG. 6 is a conceptual diagram of example non-square transform partitions for intra-predicted blocks.
Figure 6:
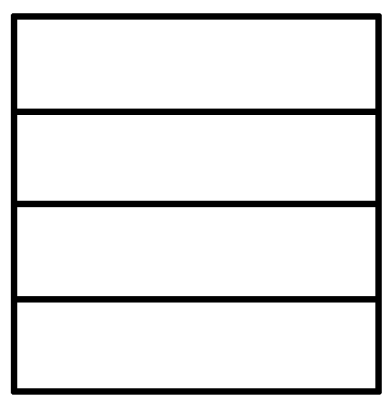

More recently, the use of non-square transforms has been proposed for use with 2N×2N PUs/TUs (i.e., level 0 of a quadtree decomposition). Some examples of non-square transforms are shown in FIG. 6. Block 33 shows vertically-oriented transform partitions, while block 35 shows horizontally-oriented transform partitions. The partition of block 33 is sometimes referred to as an hN×2N partition. In this context, the h refers to "half." As such, the width (i.e., hN) of an hN×2N partition is ¼ the length of the height (i.e., 2N) of the partition. Likewise, the partition of block 35 is sometimes referred to as a 2N×hN partition. As such, the height (i.e., hN) of a 2N×hN partition is ¼ the length of the width (i.e., 2N) of the partition. In each case, the TU partitions have a rectangular shape. Non-square transforms may be used with a technique called short distance intra-prediction (SDIP). SDIP utilizes non-square PU partitions (similar to the TU partition shown in FIG. 6) to apply intra-prediction techniques.

As proposed in this disclosure, the use of non-square transforms is extended to other levels of the quadtree structure, including level 1. Thus, a video encoder (e.g., video encoder 20) may select from a level 1 N×N transform partition (i.e., a square transform) and the non-square level 1 SDIP transform partitions. Again, non-square transform partitions may include hN×2N (e.g., block 33 of FIG. 6) and 2N×hN (e.g., block 35 of FIG. 6) partitions. Throughout this disclosure, the terms transform partition and transform unit are used interchangeably. In particular, the term transform partition may apply both to the resulting transform units, and the division of a coding unit or prediction unit into transform units. In addition, the term block or sub-block may be used to refer to any of a coding unit, prediction unit, transform partition, or transform unit. In particular, the term sub-block may be used to refer to the resulting transform units when a transform partition is further sub-divided.

The syntax used to signal the selection of a transform partition is as follows:

NS_Flag: this flag indicates if the N×N transform partition is selected. For example, if NS_Flag=0, it means the N×N transform is selected; if NS_Flag=1, it means that a non-square (e.g., hN×2N or 2N×hN) transform is selected.

NS_direction_Flag: this flag indicates which non-square transform has been selected. For example, if NS_direction_Flag=0, it means the vertically-oriented transform (hN×2N) is selected; if NS_direction_Flag=1, it means the horizontally-oriented transform (2N×hN) is selected.

As described above, non-square transform partitions may be applied at level 1 of the quadtree structure for a 2N×2N CU. This disclosure further describes methods and techniques for applying non-square transforms partitions to N×N PU/TU partitions and/or for the extension of use of non-square transform partitions to other levels of a quadtree structure.

Figure 7:
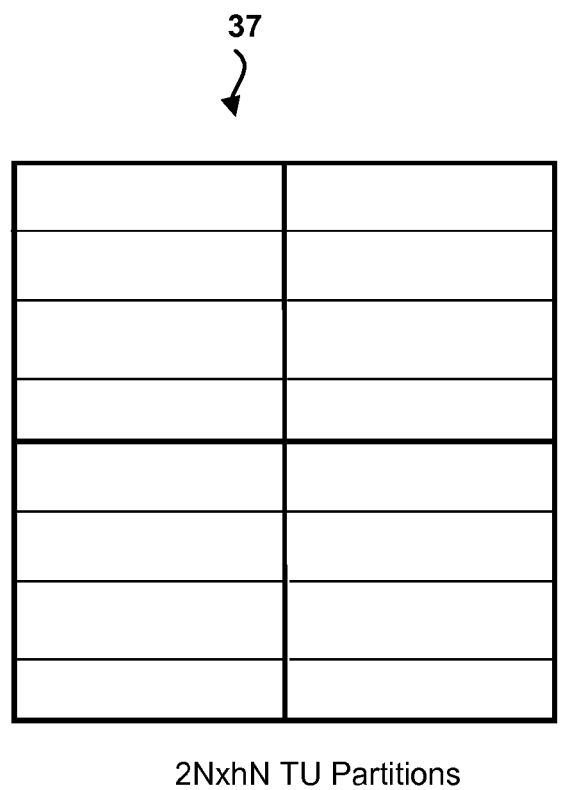
FIG. 7 is a conceptual diagram of example non-square transform partitions for an N×N prediction unit.
Figure 7:
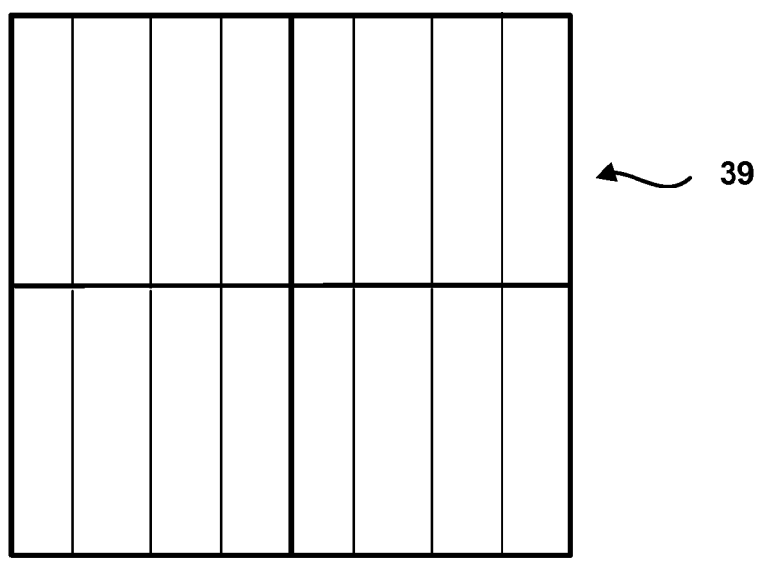

In one example of the disclosure, the NS_Flag and NS_direction_flag are signaled at the CU level. This means that, for an N×N PU partition, all four PUs in the CU share the same values for the NS_Flag and NS_direction_flag. As such, the TUs for each of the PUs are the same. Examples are shown in FIG. 7. CU 37 is divided into four N×N PUs. At the CU level, NS_Flag=1 and NS_direction_Flag=1. In this case, all four N×N Pus of CU 37 have the same non-square transforms (i.e., horizontally-oriented 2N×hN transform partitions). CU 39 is also divided into four N×N PUs. At the CU level, for CU 39, NS_Flag=1 and NS_direction_Flag=0. In this case, all four N×N PUs of CU 39 have the same non-square transforms (i.e., vertically-oriented hN×2N transform partitions).

In the example of FIG. 7, the sizes and shapes of the PUs within the CU may be different than the sizes and shapes of the TUs. In other examples, the PUs may also have a non-square shape, such as non-square PU partitions used for SDIP.

Figure 8:
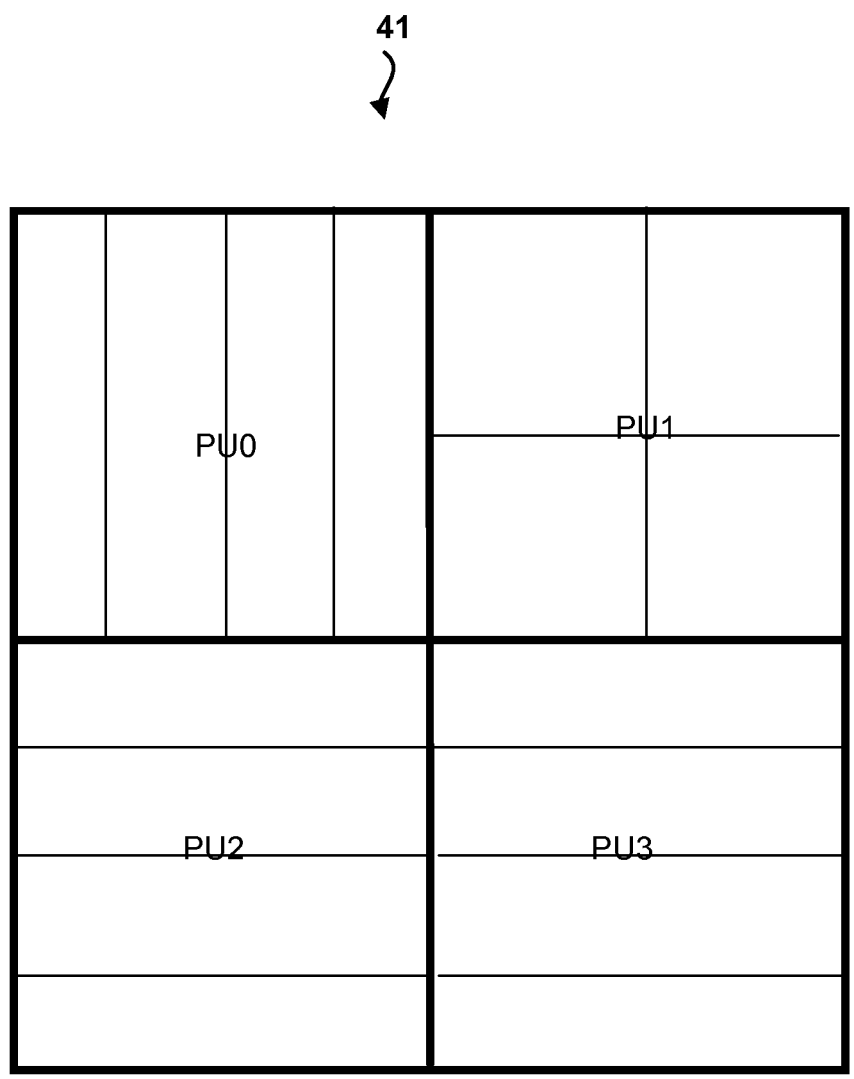
FIG. 8 is a conceptual diagram of another example non-square transform partitions for an N×N prediction unit.

In another example of the disclosure, the NS_Flag and NS_direction_flag are separately signaled for every N×N PU partition. This means that each PU is associated with its own NS_Flag and NS_direction_flag. As such, each PU may have a different transform partition. An example is shown in FIG. 8. CU 41 is divided into four N×N PUs (upper left is PU0, upper right is PU1, lower left is PU2, lower right is PU3). In this example, for PU0, the NS_Flag=1, and the NS_direction_ flag=0. As such, a vertically-oriented hN×2N non-square transform partition is used. For PU1, the NS_Flag=0. As such, a square transform partition is used. For PU2, the NS_Flag=1, and the NS_direction_flag=1. As such, a horizontally-oriented 2N×hN non-square transform partition is used. Likewise, for PU3, the NS_Flag=1, and the NS_direction_flag=1. Thus, a horizontally-oriented 2N×hN non-square transform partition is used.

Figure 9:
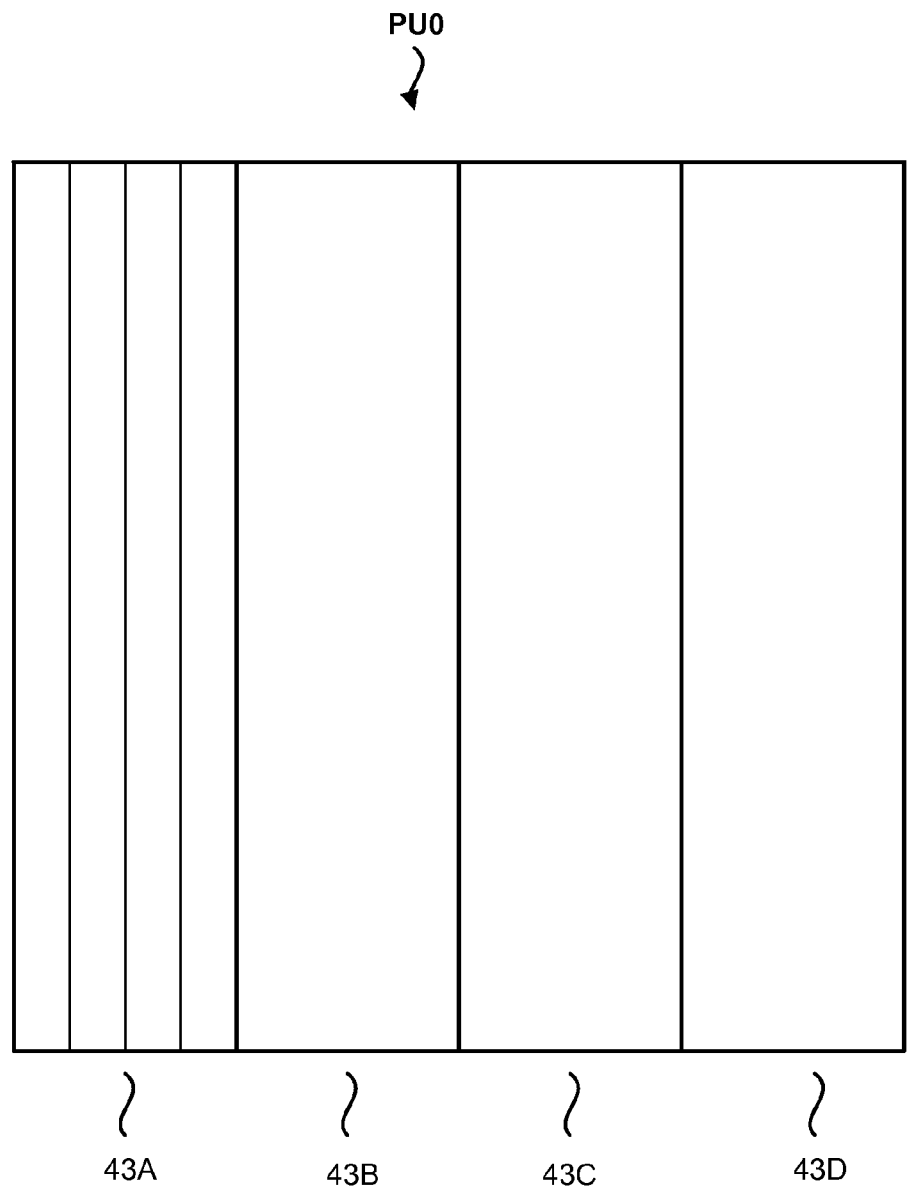
FIG. 9 is a conceptual diagram of an example of further splitting of a transform partition.

In another example of the disclosure, further to applying non-square transforms to level 1 of a quadtree structure, as shown in FIG. 7 and FIG. 8, non-square transforms are applied at other levels of quadtree decomposition (e.g., level 2, level 3, etc.). As one example, consider a case of a CU with four N×N PUs. As shown in FIG. 9, the first N×N PU (e.g., PU0 in FIG. 8 with NS_Flag=1, NS_direction_flag=0) may be first split into four vertically oriented, non-square transform sub-blocks 43A, 43B, 43C and 43D of size (¼N)×N. For each sub-block, an additional flag(s) may be signaled to indicate if the sub-block will be further split. For example, if this flag is 1, the (¼N)×N block is further split.

Figure 10:
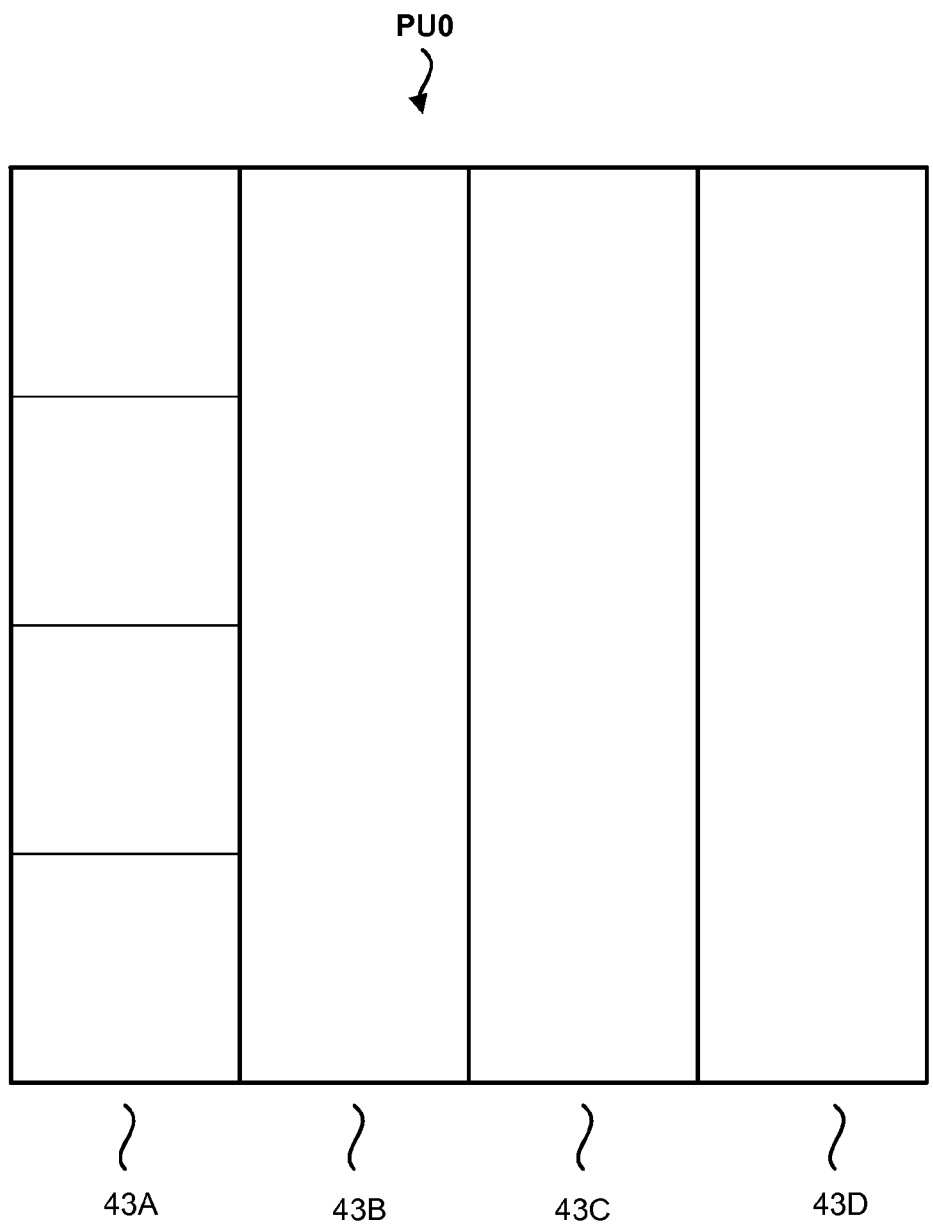
FIG. 10 is a conceptual diagram of another example of further splitting of a transform partition.
Figure 11:
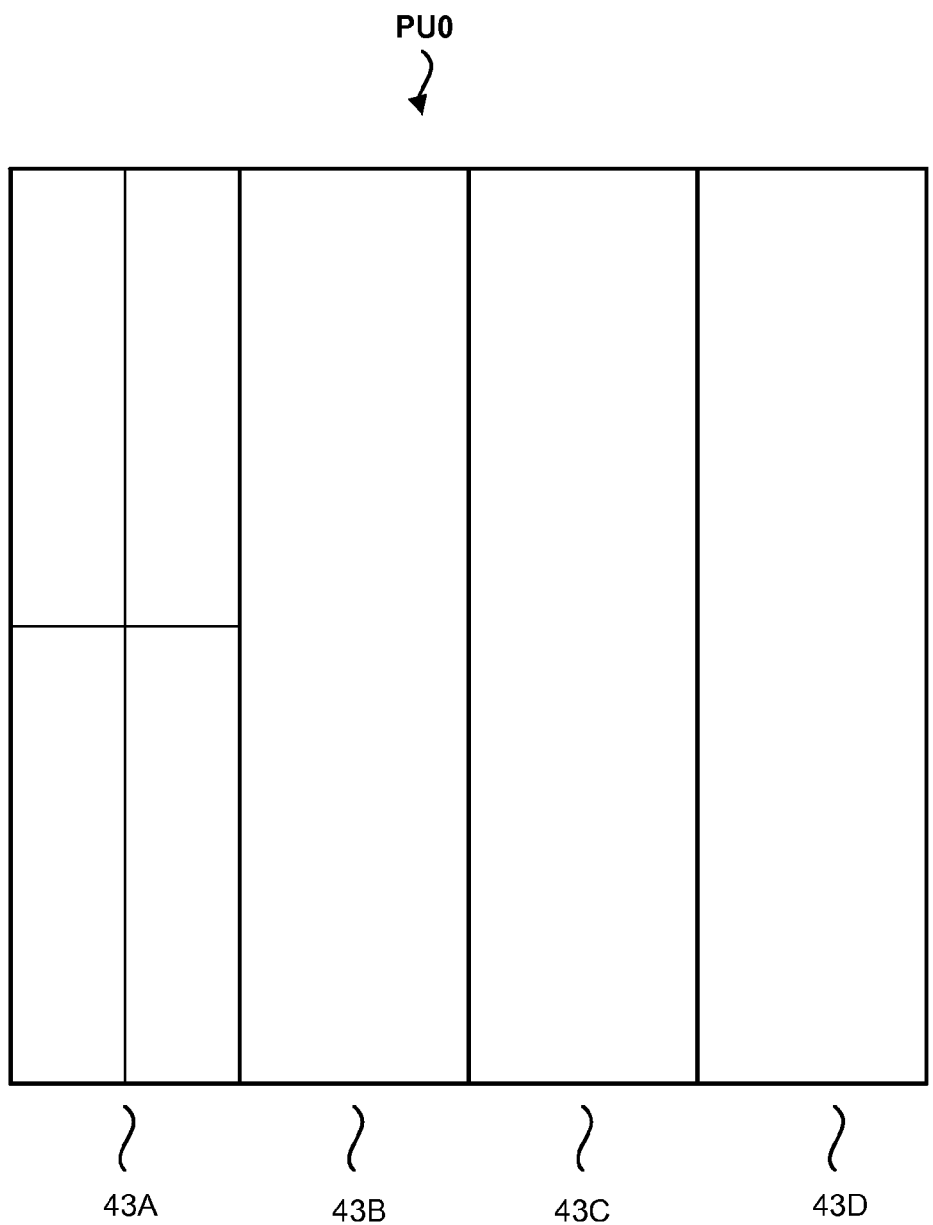
FIG. 11 is a conceptual diagram of another example of further splitting of a transform partition.

In one specific example, as shown in FIG. 9, a vertically oriented sub-block 43A may be further split into four (1/16N)×N transform partition. In other examples, sub-block 43A may be split into four (¼N)×(¼N) transform partitions or split into four (⅛N)×(½N) transform partitions. FIG. 10 shows an example of a vertically-oriented TU partition that is further split into four (¼N)×(¼N) transform partitions. FIG. 11 shows an example of a vertically-oriented TU partition that is further split into four (⅛N)×(½N) transform partitions.

To indicate the further partitioning, additional bits are signaled at the partition (e.g., PU0) level. As one example, a NS_flag_PUX and NS_direction_flag_PUX may be used. If NS_flag_PUX=0, this indicates a split into four (⅛N)×(½N) transform partitions. If NS_flag_PUX=1, the NS_direction_flag_PUX is further signaled. NS_direction_flag_PUX=0 indicates a split into four (1/16N)×N transform partitions. NS_direction_flag_PUX=1 indicates a split into four (¼N)×(¼N) transform partitions.

In the above example, there are three possible transforms partitions for further splitting, and as such, overhead bits may be used (i.e., two flags are needed). To avoid the use of multiple flags, this disclosure proposes an example technique where one transform partition type is allowed in the case of further splitting past level 1 decomposition. For example, a further split of an hN×2N transform partition is restricted to only produce four (⅛N)×2N transform partitions. As another example, a further split of a 2N×hN transform partition is restricted to only produce four 2N×(⅛N) transform partitions. As another example, a further split of an N×N transform partition is restricted to only produce four ¼N×¼N transform partitions. It should be understood that other combinations of partitions and splitting may be used.

In one example implementation of non-square transforms for intra-predicted blocks, whether to apply non-square transforms depends on the size of the CU. Consider an example where the smallest allowed/available non-square transform size is hx2N and 2N×hN for a CU with size 2N×2N. A video encoder (e.g., video encoder 20) may be configured to signal an NS_Flag and NS_direction_Flag to specify the selection of the non-square transform partition. In some cases, this may waste bits. For example, suppose the video encoder is coding blocks at level 1 of the quadtree structure (where the transform block is of size N×N). As such, no hx2N or 2N×hN transform partition can fit the block size at that level. However, since the decision in the example implementation is based on CU size, and CU size 2N×2N is larger than (½N)×2N and 2N×(½N), the encoder may still signal the NS_Flag and NS_direction_Flag, thus wasting bits.

To remedy this potential drawback, this disclosure further proposes that the decision to signaling the NS_Flag and the NS_direction_Flag is based on the transform block size. For example, let the transform block size be M×M, and the smallest non-square transform size is A×B and B×A. If M<max(A, B), non-square transform partitioning cannot be applied to this transform block, and thus the encoder does not signal the NS_Flag and the NS_direction_Flag. Otherwise, these syntax elements are signaled.

Figure 12:
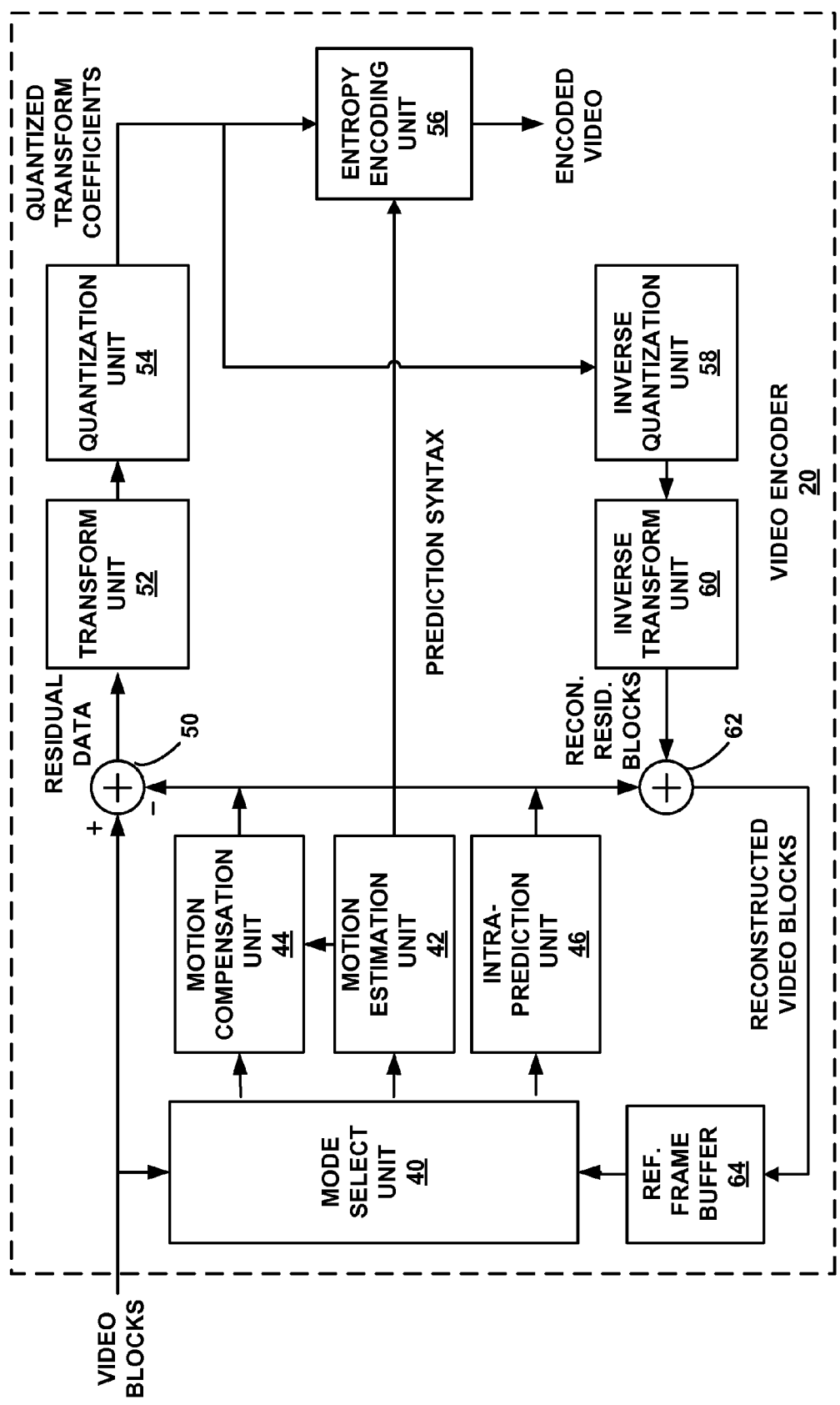
FIG. 12 is a block diagram illustrating an example video encoder.

FIG. 12 is a block diagram illustrating an example of video encoder 20 that may use techniques for intra-prediction coding as described in this disclosure. The video encoder 20 will be described in the context of HEVC coding for purposes of illustration, but without limitation of this disclosure as to other coding standards or methods that may require scanning of transform coefficients. Video encoder 20 may perform intra- and inter-coding of PUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 12, video encoder 20 receives a current video block within a video frame to be encoded. In the example of FIG. 12, video encoder 20 includes motion compensation unit 44, motion estimation unit 42, intra-prediction unit 46, reference frame buffer 64, summer 50, transform unit 52, quantization unit 54, and entropy encoding unit 56. For video block reconstruction, video encoder 20 also includes inverse quantization unit 58, inverse transform unit 60, and summer 62. A deblocking filter (not shown in FIG. 12) may also be included to filter block boundaries to remove blockiness artifacts from reconstructed video. If desired, the deblocking filter would typically filter the output of summer 62.

During the encoding process, video encoder 20 receives a video frame or slice to be coded. The frame or slice may be divided into multiple video blocks, e.g., largest coding units (LCUs). Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on a rate distortion analysis for each mode, and provides the resulting intra- or inter-predicted block (e.g., a prediction unit (PU)) to summer 50 to generate residual block data and to summer 62 to reconstruct the encoded block for use in a reference frame. Summer 62 combines the predicted block with inverse quantized, inverse transformed data from inverse transform unit 60 for the block to reconstruct the encoded block, as described in greater detail below. Some video frames may be designated as I-frames, where all blocks in an I-frame are encoded in an intra-prediction mode. In some cases, the intra-prediction unit 46 may perform intra-prediction encoding of a block in a P- or B-frame, e.g., when motion search performed by motion estimation unit 42 does not result in a sufficient prediction of the block.

Motion estimation unit 42 and motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample of a reference frame. Motion estimation unit 42 calculates a motion vector for a prediction unit of an inter-coded frame by comparing the prediction unit to reference samples of a reference frame stored in reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position.

Motion estimation unit 42 sends the calculated motion vector to entropy encoding unit 56 and motion compensation unit 44. The portion of the reference frame identified by a motion vector may be referred to as a reference sample. Motion compensation unit 44 may calculate a prediction value for a prediction unit of a current CU, e.g., by retrieving the reference sample identified by a motion vector for the PU.

Intra-prediction unit 46 may perform intra-prediction on the received block, as an alternative to inter-prediction performed by motion estimation unit 42 and motion compensation unit 44. Intra-prediction unit 46 may predict the received block relative to neighboring, previously coded blocks, e.g., blocks above, above and to the right, above and to the left, or to the left of the current block, assuming a left-to-right, top-to-bottom encoding order for blocks. Intra-prediction unit 46 may be configured with a variety of different intra-prediction modes. For example, intra-prediction unit 46 may be configured with a certain number of directional prediction modes, e.g., thirty-five directional prediction modes, based on the size of the CU being encoded.

Intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, intra-prediction unit 46 may calculate an error value for the prediction mode based on pixel differences between the PU and the received block to be encoded. Intra-prediction unit 46 may continue testing intra-prediction modes until an intra-prediction mode that yields an acceptable error value is discovered. Intra-prediction unit 46 may then send the PU to summer 50.

Video encoder 20 forms a residual block by subtracting the prediction data calculated by motion compensation unit 44 or intra-prediction unit 46 from the original video block being coded. Summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

Transform unit 52 may form one or more transform units (TUs) from the residual block. Transform unit 52 selects a transform from among a plurality of transforms. The transform may be selected based on one or more coding characteristics, such as block size, coding mode, or the like. Transform unit 52 then applies the selected transform to the TU, producing a video block comprising a two-dimensional array of transform coefficients. Transform unit 52 may select the transform partitions for intra-coded blocks according to above-described techniques of this disclosure. Transform unit 52, or another unit of video encoder 20, may signal the selected transform partition type and/or direction in the encoded video bitstream.

Transform unit 52 may send the resulting transform coefficients to quantization unit 54. Quantization unit 54 may then quantize the transform coefficients. Entropy encoding unit 56 may then perform a scan of the quantized transform coefficients in the matrix according to a scanning mode. This disclosure describes entropy encoding unit 56 as performing the scan. However, it should be understood that, in other examples, other processing units, such as quantization unit 54, could perform the scan.

Once the transform coefficients are scanned into the one-dimensional array, entropy encoding unit 56 may apply entropy coding such as CAVLC, CABAC, PIPE, syntax-based context-adaptive binary arithmetic coding (SBAC), or another entropy coding methodology to the coefficients.

To perform CAVLC, entropy encoding unit 56 may select a variable length code for a symbol to be transmitted. Codewords in VLC may be constructed such that relatively shorter codes correspond to more likely symbols, while longer codes correspond to less likely symbols. In this way, the use of VLC may achieve a bit savings over, for example, using equal-length codewords for each symbol to be transmitted.

To perform CABAC, entropy encoding unit 56 may select a context model to apply to a certain context to encode symbols to be transmitted. The context may relate to, for example, whether neighboring values are non-zero or not. Entropy encoding unit 56 may also entropy encode syntax elements, such as the signal representative of the selected transform. In accordance with the techniques of this disclosure, entropy encoding unit 56 may select the context model used to encode these syntax elements based on, for example, an intra-prediction direction for intra-prediction modes, a scan position of the coefficient corresponding to the syntax elements, block type, and/or transform type, among other factors used for context model selection.

Following the entropy coding by entropy encoding unit 56, the resulting encoded video may be transmitted to another device, such as video decoder 30, or archived for later transmission or retrieval. In some cases, entropy encoding unit 56 or another unit of video encoder 20 may be configured to perform other coding functions, in addition to entropy coding. For example, entropy encoding unit 56 may be configured to determine coded block pattern (CBP) values for CU's and PU's. Also, in some cases, entropy encoding unit 56 may perform run length coding of coefficients.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame buffer 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame buffer 64. The reconstructed video block may be used by motion estimation unit 42 and motion compensation unit 44 as a reference block to inter-code a block in a subsequent video frame.

Figure 13:
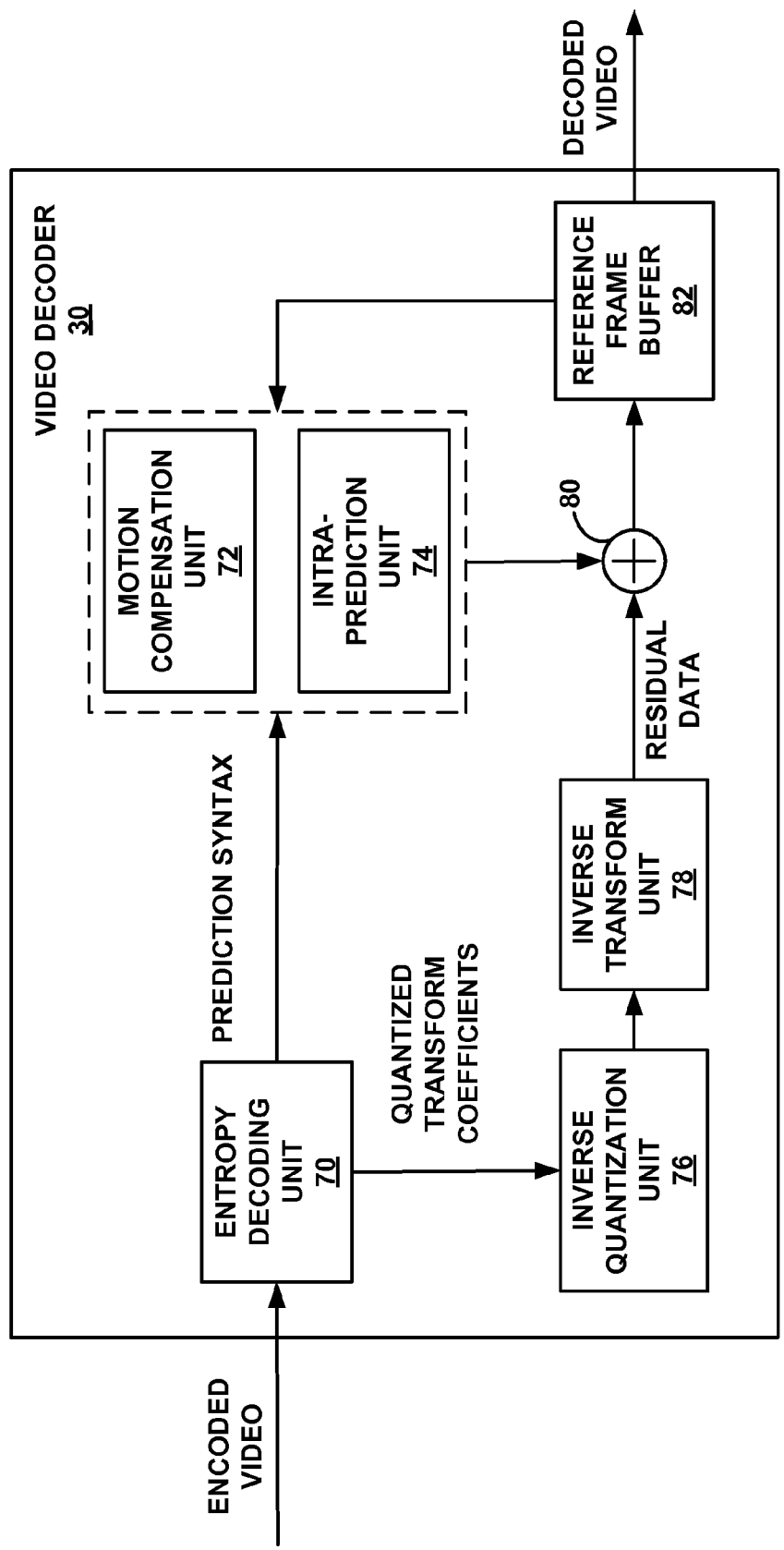
FIG. 13 is a block diagram illustrating an example video decoder.

FIG. 13 is a block diagram illustrating an example of video decoder 30, which decodes an encoded video sequence. In the example of FIG. 13, video decoder 30 includes entropy decoding unit 70, motion compensation unit 72, intra-prediction unit 74, inverse quantization unit 76, inverse transformation unit 78, reference frame buffer 82 and summer 80. Video decoder 30 may, in some examples, perform a decoding pass generally reciprocal to the encoding pass described with respect to video encoder 20 (see FIG. 12).

Entropy decoding unit 70 performs an entropy decoding process on the encoded bitstream to retrieve a one-dimensional array of transform coefficients. The entropy decoding process used depends on the entropy coding used by video encoder 20 (e.g., CABAC, CAVLC, etc.). The entropy coding process used by the encoder may be signaled in the encoded bitstream or may be a predetermined process.

In some examples, entropy decoding unit 70 (or inverse quantization unit 76) may scan the received values using a scan mirroring the scanning mode used by entropy encoding unit 56 (or quantization unit 54) of video encoder 20. Although the scanning of coefficients may be performed in inverse quantization unit 76, scanning will be described for purposes of illustration as being performed by entropy decoding unit 70. In addition, although shown as separate functional units for ease of illustration, the structure and functionality of entropy decoding unit 70, inverse quantization unit 76, and other units of video decoder 30 may be highly integrated with one another.

Inverse quantization unit 76 inverse quantizes, i.e., dequantizes, the quantized transform coefficients provided in the bitstream and decoded by entropy decoding unit 70. The inverse quantization process may include a conventional process, e.g., similar to the processes proposed for HEVC or defined by the H.264 decoding standard. The inverse quantization process may include use of a quantization parameter QP calculated by video encoder 20 for the CU to determine a degree of quantization and, likewise, a degree of inverse quantization that should be applied. Inverse quantization unit 76 may inverse quantize the transform coefficients either before or after the coefficients are converted from a one-dimensional array to a two-dimensional array.

Inverse transform unit 78 applies an inverse transform to the inverse quantized transform coefficients. In some examples, inverse transform unit 78 may determine an inverse transform based on signaling from video encoder 20, or by inferring the transform from one or more coding characteristics such as block size, coding mode, or the like. In some examples, inverse transform unit 78 may determine a transform to apply to the current block based on a signaled transform partition type received in an encoded video bitstream according to the above-described techniques of this disclosure. In particular, a syntax element indicating the use of square or non-square partition types, as well as a syntax element indicating a partition direction for a non-square partition, may be received for intra-predicted blocks. In some examples, inverse transform unit 78 may apply a cascaded inverse transform, in which inverse transform unit 78 applies two or more inverse transforms to the transform coefficients of the current block being decoded.

Intra-prediction unit 74 may generate prediction data for a current block of a current frame based on a signaled intra-prediction mode and data from previously decoded blocks of the current frame.

Based on the retrieved motion prediction direction, reference frame index, and calculated current motion vector, the motion compensation unit produces a motion compensated block for the current portion. These motion compensated blocks essentially recreate the predictive block used to produce the residual data.

Motion compensation unit 72 may produce the motion compensated blocks, possibly performing interpolation based on interpolation filters. Identifiers for interpolation filters to be used for motion estimation with sub-pixel precision may be included in the syntax elements. Motion compensation unit 72 may use interpolation filters as used by video encoder 20 during encoding of the video block to calculate interpolated values for sub-integer pixels of a reference block. Motion compensation unit 72 may determine the interpolation filters used by video encoder 20 according to received syntax information and use the interpolation filters to produce predictive blocks.

Additionally, motion compensation unit 72 and intra-prediction unit 74, in an HEVC example, may use some of the syntax information (e.g., provided by a quadtree) to determine sizes of LCUs used to encode frame(s) of the encoded video sequence. Motion compensation unit 72 and intra-prediction unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

Summer 80 combines the residual blocks with the corresponding prediction blocks generated by motion compensation unit 72 or intra-prediction unit 74 to form decoded blocks. If desired, a deblocking filter may also be applied to filter the decoded blocks in order to remove blockiness artifacts. The decoded video blocks are then stored in reference frame buffer 82, which provides reference blocks for subsequent motion compensation and also produces decoded video for presentation on a display device (such as display device 32 of FIG. 1).

Figure 14:
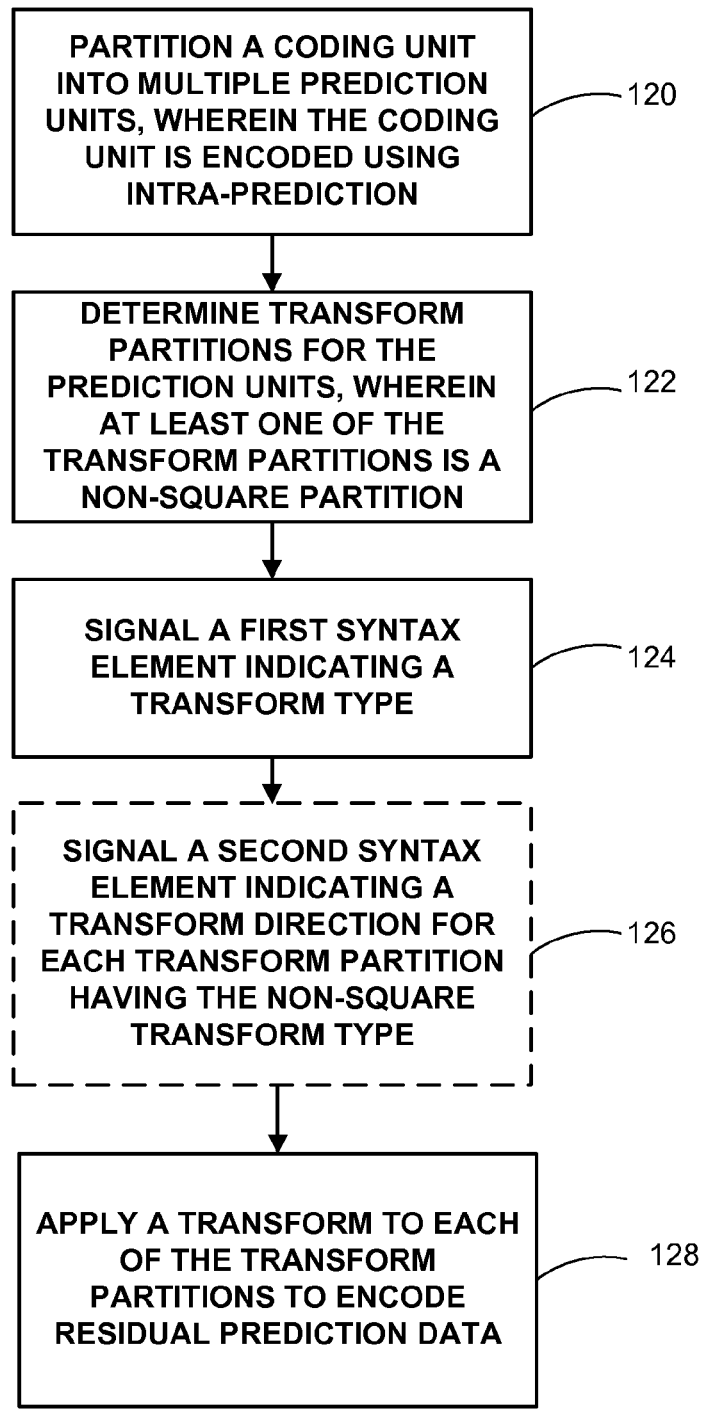
FIG. 14 is a flowchart illustrating an example video encoding method according to the techniques of this disclosure.

FIG. 14 is a flowchart illustrating an example video encoding method according to the techniques of this disclosure. The method of FIG. 14 may be executed by one or more components, units, or module of video encoder 20.

Video encoder 20 may be configured to perform a video encoding method in accordance with the techniques of this disclosure. In one example, video encoder 20 may be configured to partition a coding unit into multiple prediction units, wherein the coding unit is encoded using intra-prediction (120), and to determine transform partitions for the prediction units, wherein at least one of the transform partitions is a non-square partition (122). In this way, non-square transforms are applied at levels higher than level 0 (e.g., level 1) of the quadtree structure. For example, the prediction units may be at level 1 of a quadtree structure.

In other examples of the disclosure, the partitioning (120) and determining (122) steps may be executed at higher levels of the quadtree structure. For example, video encoder 20 may be further configured to partition the one or more of the multiple prediction units into sub-blocks according to the determined transform partition, and to determine a further partition type for each of the sub-blocks. In one example, the sub-blocks are at a quadtree decomposition level of 2 or greater. In one example, the further partition type is determined based on the determined transform partition used to partition the multiple prediction units into sub-blocks. In another example, video encoder 20 may be further configured to limit the further partition type to one transform type and one transform direction. In another example, video encoder 20 may be configured to determine the further partition type for the sub-blocks based on a partition size of the sub-blocks.

Video encoder 20 may be further configured to signal a first syntax element indicating a transform type, wherein the transform type is selected from at least one of a square transform partition and a non-square transform partition (124). In one example of the disclosure, video encoder 20 may be configured to determine the transform partition for the coding unit so that each of the multiple prediction units has the same transform partition. In this case, the first syntax element is signaled at the coding unit level. In another example of the disclosure, video encoder 20 may be configured to determine the transform partition for each of the multiple prediction units separately. In this case, the first syntax element is signaled at the prediction unit level.

Video encoder 20 may be further configured to, in the case that the first syntax element indicates the non-square transform type, signal a second syntax element indicating a transform direction for each transform partition having the non-square transform type, wherein the transform direction is selected from at least one of a horizontally-oriented direction and a vertically-oriented direction (126). Video encoder 20 may be further configured to apply a transform to each of the transform partitions to encode residual prediction data (128).

Figure 15:
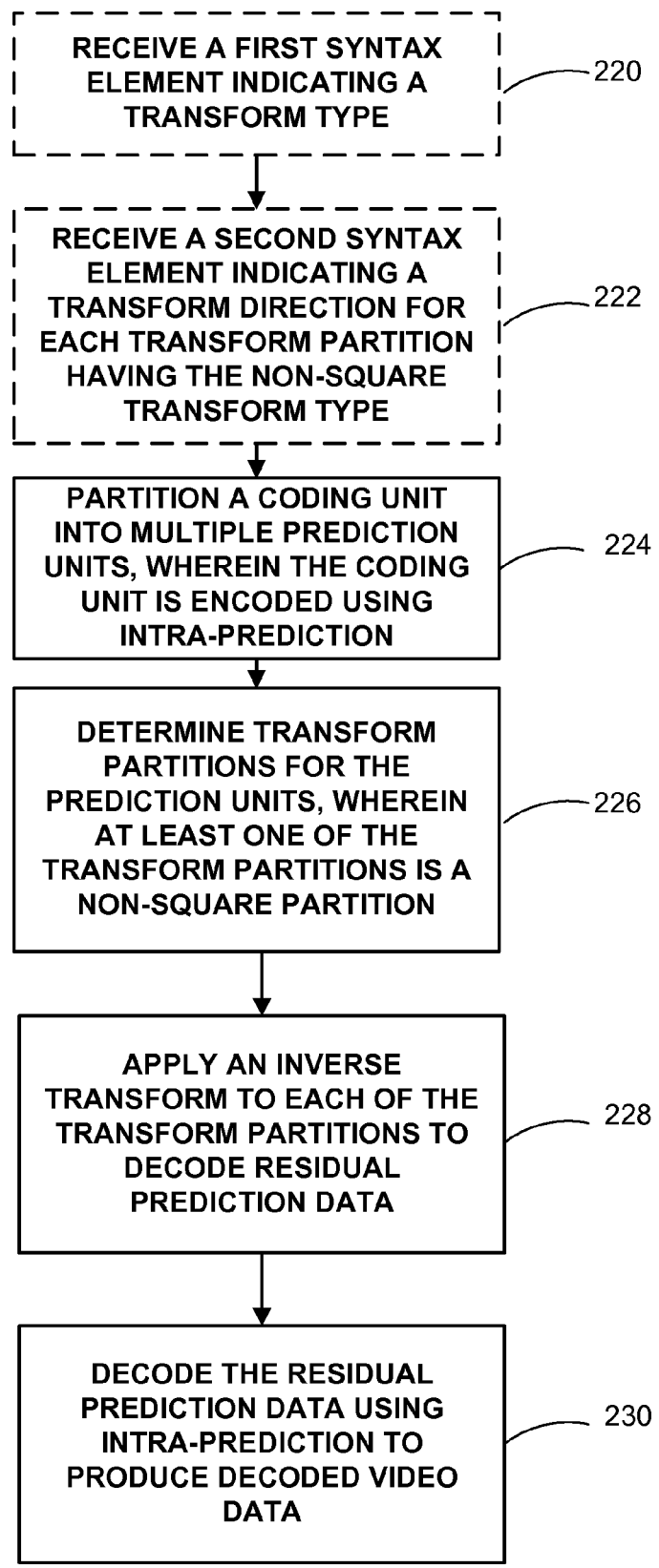
FIG. 15 is a flowchart illustrating an example video decoding method according to the techniques of this disclosure.

FIG. 15 is a flowchart illustrating an example video decoding method according to the techniques of this disclosure. The method of FIG. 15 may be executed by one or more components, units, or module of video decoder 30. The use of non-square partitions by video decoder 30 may be in response to bitstream signaling performed by a video encoder (e.g., video encoder 20) or may be based on predetermined rules that match the rules employed by a video encoder.

Video decoder 30 may be configured to perform a video decoding method in accordance with the techniques of this disclosure. In one example, video decoder 30 may be configured to receive a first syntax element indicating a transform type, wherein the transform type is selected from at least one of a square transform partition and a non-square transform partition (220), and, in the case that the first syntax element indicates the non-square transform type, to receive a second syntax element indicating a transform direction for each transform partition having the non-square transform type, wherein the transform direction is selected from at least one of a horizontally-oriented direction and a vertically-oriented direction (222). It should be noted that the receiving steps are optional if video decoder 30 is configured to determine the use of non-square partitions implicitly or through predetermined rules, rather than through explicit signaling.

Whether implicitly (e.g., through rules) or explicitly (e.g., through the received first and second syntax elements), video decoder 30 may be further configured to partition a coding unit into multiple prediction units, wherein the coding unit is encoded using intra-prediction (224), and to determine transform partitions for the prediction units, wherein at least one of the transform partitions is a non-square partition (226).

In one example of the disclosure, the first and second syntax elements are received at the coding unit level. As such, video decoder 30 may be configured to determine the transform partition for the coding unit so that each of the multiple prediction units has the same transform partition. In another example of the disclosure, the first and second syntax elements are received at the prediction unit level. As such, video decoder 30 may be configured to determine the transform partition for each of the multiple prediction units separately. In this way, non-square transforms are applied at levels higher than level 0 (e.g., level 1) of the quadtree structure. For example, the prediction units may be at level 1 of a quadtree structure.

In other examples of the disclosure, the partitioning (224) and determining (226) steps may be executed at higher levels of the quadtree structure. For example, video decoder 30 may be further configured to partition the one or more of the multiple prediction units into sub-blocks according to the determined transform partition, and to determine a further partition type for each of the sub-blocks. In one example, the sub-blocks are at a quadtree decomposition level of 2 or greater. In one example, the further partition type is determined based on the determined transform partition used to partition the multiple prediction units into sub-blocks. In another example, video decoder 30 may be further configured to limit the further partition type to one transform type and one transform direction. In another example, video decoder 30 may be configured to determine the further partition type for the sub-blocks based on a partition size of the sub-blocks.

Video decoder 30 may be further configured to apply an inverse transform to each of the transform partitions to decode residual prediction data (228). Video decoder 30 may be further configured to decode the residual prediction data using intra-prediction to produce decoded video data (230).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A video encoding method comprising:
   partitioning a coding unit into four N×N prediction units, wherein the coding unit is encoded using intra-prediction;
   determining a respective transform partition for each respective prediction unit, wherein at least one of the determined transform partitions is a non-square rectangular partition, and wherein the transform partitions are defined by a shape and a direction;
   partitioning each of the respective prediction units into transform blocks according to the respective determined transform partitions;
   signaling a first syntax element for each of the respective prediction units, the first syntax element indicating the shape of the respective transform partitions for the respective prediction unit;
   signaling, in the case that the first syntax element indicates a non-square shape, a second syntax element for the respective prediction unit having the transform partition with the non-square shape, the second syntax element indicating the direction of the non-square shape;
   determining a further partition type for each of the transform blocks; and
   signaling a third syntax element at a transform block level for each respective transform block, the third syntax element indicating that a particular one of the transform blocks is further split based on the determined further partition type.

2. The video encoding method of claim 1, wherein the prediction units are at level 1 of a quadtree structure.

3. The video encoding method of claim 1, wherein the transform blocks are at a quadtree decomposition level of 2 or greater.

4. The video encoding method of claim 1, wherein determining the further partition type comprises determining the further partition type based on the determined respective transform partition used to partition the respective prediction unit into transform blocks.

5. The video encoding method of claim 1,
   wherein determining the further partition type comprises determining the further partition type using one transform type and one transform direction.

6. The video encoding method of claim 1, wherein determining the further partition type comprises determining the further partition type based on a partition size of the transform blocks.

7. The video encoding method of claim 1, further comprising:
   applying a transform to each of the transform blocks to encode residual prediction data.

8. A video decoding method comprising:
   partitioning a coding unit into four N×N prediction units, wherein the coding unit is encoded using intra-prediction;
   receiving a first syntax element for each of the prediction units, the first syntax element indicating a shape of respective transform partitions for each respective prediction unit;
   receiving, in the case that the first syntax element indicates a non-square shape, a second syntax element for the respective prediction unit having the transform partition with the non-square shape, the second syntax element indicating a direction of the non-square shape;
   partitioning each of the respective prediction units into transform blocks according to the first syntax element and the second syntax element for each respective prediction unit;
   receiving a third syntax element at a transform block level for each transform block, the third syntax element indicating whether a particular one of the transform blocks is further split; and
   further partitioning the transform blocks based on the third syntax element.

9. The video decoding method of claim 8, wherein the prediction units are at level 1 of a quadtree structure.

10. The video decoding method of claim 8, wherein the transform blocks are at a quadtree decomposition level of 2 or greater.

11. The video decoding method of claim 8,
    wherein further partitioning the transform blocks comprises further partitioning the transform blocks based on the third syntax element using one transform type and one transform direction.

12. The video decoding method of claim 8, wherein further partitioning the transform blocks comprises further partitioning the transform blocks based on the third syntax element and a partition size of the transform blocks.

13. The video decoding method of claim 8, further comprising:
applying an inverse transform to each of the transform blocks to decode residual prediction data.

14. The video decoding method of claim 13, further comprising:
decoding the residual prediction data using intra-prediction to produce decoded video data.

15. A video encoding apparatus comprising:
a memory configured to store video data; and
a video encoder configured to:
partition a coding unit of the video data into four N×N prediction units, wherein the coding unit is encoded using intra-prediction;
determine a respective transform partition for each respective prediction unit, wherein at least one of the determined transform partitions is a non-square rectangular partition, and wherein the transform partitions are defined by a shape and a direction;
partition each of the respective prediction units into transform blocks according to the respective determined transform partitions;
signal a first syntax element for each of the respective prediction units, the first syntax element indicating the shape of the respective transform partitions for the respective prediction unit;
signal, in the case that the first syntax element indicates a non-square shape, a second syntax element for the respective prediction unit having the transform partition with the non-square shape, the second syntax element indicating the direction of the non-square shape;
determine a further partition type for each of the transform blocks; and
signal a third syntax element at a transform block level for each respective transform block, the third syntax element indicating that a particular one of the transform blocks is further split based on the determined further partition type.

16. The video encoding apparatus of claim 15, wherein the prediction units are at level 1 of a quadtree structure.

17. The video encoding apparatus of claim 15, wherein the transform blocks are at a quadtree decomposition level of 2 or greater.

18. The video encoding apparatus of claim 15, wherein the video encoder is further configured to determine the further partition type based on the determined respective transform partition used to partition the respective prediction unit into transform blocks.

19. The video encoding apparatus of claim 15, wherein the video encoder is further configured to:
determine the further partition type using one transform type and one transform direction.

20. The video encoding apparatus of claim 15, wherein the video encoder is further configured to determine the further partition type based on a partition size of the transform blocks.

21. The video encoding apparatus of claim 15, wherein the video encoder is further configured to:
apply a transform to each of the transform blocks to encode residual prediction data.

22. A video decoding apparatus comprising:
a memory configured to store video data; and
a video decoder configured to:
partition a coding unit of the video data into four N×N prediction units, wherein the coding unit is encoded using intra-prediction;
receive a first syntax element for each of the prediction units, the first syntax element indicating a shape of respective transform partitions for each respective prediction unit;
receive, in the case that the first syntax element indicates a non-square shape, a second syntax element for the respective prediction unit having the transform partition with the non-square shape, the second syntax element indicating a direction of the non-square shape;
partition each of the respective prediction units into transform blocks according to the first syntax element and the second syntax element for each respective prediction unit;
receive a third syntax element at a transform block level for each transform block, the third syntax element indicating whether a particular one of the transform blocks is further split; and
further partition the transform blocks based on the third syntax element.

23. The video decoding apparatus of claim 22, wherein the prediction units are at level 1 of a quadtree structure.

24. The video decoding apparatus of claim 22, wherein the transform blocks are at a quadtree decomposition level of 2 or greater.

25. The video decoding apparatus of claim 22, wherein the video decoder is further configured to:
partition the transform blocks based on the third syntax element using one transform type and one transform direction.

26. The video decoding apparatus of claim 22, wherein the video decoder is further configured to:
partition the transform blocks based on the third syntax element and a partition size of the transform blocks.

27. The video decoding apparatus of claim 22, wherein the video decoder is further configured to:
apply an inverse transform to each of the transform partitions to decode residual prediction data.

28. The video decoding apparatus of claim 27, wherein the video decoder is further configured to:
decode the residual prediction data using intra-prediction to produce decoded video data.

29. A video encoding apparatus comprising:
means for partitioning a coding unit into four N×N prediction units, wherein the coding unit is encoded using intra-prediction;
means for determining a respective transform partition for each respective prediction unit, wherein at least one of the determined transform partitions is a non-square rectangular partition, and wherein the transform partitions are defined by a shape and a direction;
means for partitioning each of the respective prediction units into transform blocks according to the respective determined transform partitions;
means for signaling a first syntax element for each of the respective prediction units, the first syntax element indicating the shape of the respective transform partitions for the respective prediction unit;
means for signaling, in the case that the first syntax element indicates a non-square shape, a second syntax element for the respective prediction unit having the transform partition with the non-square shape, the second syntax element indicating the direction of the non-square shape;

means for determining a further partition type for each of the transform blocks; and means for signaling a third syntax element at a transform block level for each respective transform block, the third syntax element indicating that a particular one of the transform blocks is further split based on the determined further partition type.

30. A video decoding apparatus comprising:

means for partitioning a coding unit into four N×N prediction units, wherein the coding unit is encoded using intra-prediction;

means for receiving a first syntax element for each of the prediction units, the first syntax element indicating a shape of respective transform partitions for each respective prediction unit;

means for receiving, in the case that the first syntax element indicates a non-square shape, a second syntax element for the respective prediction unit having the transform partition with the non-square shape, the second syntax element indicating a direction of the non-square shape;

means for partitioning each of the respective prediction units into transform blocks according to the first syntax element and the second syntax element for each respective prediction unit;

means for receiving a third syntax element at a transform block level for each transform block, the third syntax element indicating whether a particular one of the transform blocks is further split; and means for further partitioning the transform blocks based on the third syntax element.

31. A non-transitory computer-readable storage medium storing instructions that, when executed, cause on or more processors of a device configured to encode video data to:

partition a coding unit into four N×N prediction units, wherein the coding unit is encoded using intra-prediction;

determine a respective transform partition for each respective prediction unit, wherein at least one of the determined transform partitions is a non-square rectangular partition, and wherein the transform partitions are defined by a shape and a direction;

partition each of the respective prediction units into transform blocks according to the respective determined transform partitions;

signal a first syntax element for each of the respective prediction units, the first syntax element indicating the shape of the respective transform partitions for the respective prediction unit;

signal, in the case that the first syntax element indicates a non-square shape, a second syntax element for the respective prediction unit having the transform partition with the non-square shape, the second syntax element indicating the direction of the non-square shape;

determine a further partition type for each of the transform blocks; and signal a third syntax element at a transform block level for each respective transform block, the third syntax element indicating that a particular one of the transform blocks is further split based on the determined further partition type.

32. A non-transitory computer-readable storage medium storing instructions that, when executed, cause on or more processors of a device configured to decode video data to:

partition a coding unit into four N×N prediction units, wherein the coding unit is encoded using intra-prediction;

receive a first syntax element for each of the prediction units, the first syntax element indicating a shape of respective transform partitions for each respective prediction unit;

receive, in the case that the first syntax element indicates a non-square shape, a second syntax element for the respective prediction unit having the transform partition with the non-square shape, the second syntax element indicating a direction of the non-square shape;

partition each of the respective prediction units into transform blocks according to the first syntax element and the second syntax element for each respective prediction unit;

receive a third syntax element at a transform block level for each transform block, the third syntax element indicating whether a particular one of the transform blocks is further split; and further partition the transform blocks based on the third syntax element.

* * * * *